United States Patent [19]

Rader et al.

[11] 4,366,133

[45] Dec. 28, 1982

[54] PROCESS FOR LIMITING CHLORIDE BUILDUP IN SO₂ SCRUBBER SLURRY

[75] Inventors: Philip C. Rader; Dante Frabotta; Robert W. Hanson, all of Birmingham, Ala.

[73] Assignee: Combustion Engineering, Inc., Windsor, Conn.

[21] Appl. No.: 268,616

[22] Filed: Jun. 1, 1981

[51] Int. Cl.³ .............................................. C01B 17/00
[52] U.S. Cl. ..................................... 423/242; 423/497
[58] Field of Search ........... 423/242 R, 242 A, 244 R, 423/244 A, 497

[56] References Cited

U.S. PATENT DOCUMENTS

| | | | |
|---|---|---|---|
| 3,386,798 | 6/1968 | Bevans et al. | 423/242 |
| 3,826,816 | 7/1974 | McCormick | 423/497 |
| 3,929,968 | 12/1975 | Taub | 423/242 |
| 4,322,393 | 3/1982 | Heason et al. | 423/242 |

Primary Examiner—O. R. Vertiz
Assistant Examiner—Gregory A. Heller
Attorney, Agent, or Firm—William W. Habelt

[57] ABSTRACT

In the process of scrubbing flue gas to remove pollutants therefrom by contacting the flue gas with an aqueous reactant mixture of water and pollutant absorbent, water soluble chloride impurities present in the flue gas and make-up water tend to build-up as the supernatent liquor from the spent reactant mixture dewatering cycle is recycled for mixing with unreacted pollutant absorbent to form additional reactant mixture for contacting with the pollutant laden gas. The build-up of chlorides in the reactant mixture is controlled by passing a purge stream of the chloride containing liquor in contact with a hot drying gas so as to evaporate the water and crystallize the chloride impurities in the purge stream. The crystallized particles of chloride salt are then removed from the drying gas as a dry solid.

4 Claims, 2 Drawing Figures

PROCESS FOR LIMITING CHLORIDE BUILDUP IN SO₂ SCRUBBER SLURRY

BACKGROUND OF THE INVENTION

The present invention relates generally to the treatment of flue gas for the removal of pollutants therefrom, and more particularly, to a process for limiting the buildup of chlorides in the reactant mixture.

The treatment of the flue gas generated during the combustion of fossil fuels for the removal of various pollutants, particularly sulfur oxides, contained in the flue gas is well known in the prior art. Over the years, a number of processes have been developed or proposed for removing sulfur oxides, other gaseous pollutants, ans particulate matter, such as fly ash, from the flue gas. The most common process in commercial use today is termed wet scrubbing and involves contacting the flue gas with an aqueous medium containing chemicals which will react with the pollutants present in the flue gas and thereby remove the pollutants from the flue gas.

In a typical wet scrubber for removing sulfur oxides, the flue gas is passed into a scrubber module, such as a spray tower or other absorber type known in the art, wherein the flue gas is contacted with a spray of the aqueous reactant. The sulfur oxides contained in the flue gas react with the absorbent additive in the mixture to form the bisulfite, sulfite and sulfate salts of the additive. The spent absorbent mixture, rich in sulfur salts, is allowed to drain from the scrubber module and is collected in a reaction tank to which additional unreacted sulfur oxide absorbent is added to regenerate the absorbent mixture which is then recirculated to the scrubber module and sprayed into the incoming flue gas.

In the reaction tank, the relatively water-insoluable sulfite and sulfate salts of the absorbent crystalize thereby forming a concentration of solids in the mixture. To control the solids concentration of the mixture a portion of the mixture is passed from the reaction tank through a dewatering cycle. In a typical dewatering cycle, the spent reactant mixture is passed to a thickener wherein the sulfite and sulfate salts are allowed to settle out. The sulfite and sulfate salts settle in the thickener leaving a relatively solids free supernatant liquor. The sulfite and sulfate salts, referred to as sludge, are removed from the thickener and passed to a dewatering device, typically a vacuum filter or a filter press, wherein much of the liquid remaining in the sludge is removed to yield a sludge suitable for eventual disposal. The additional liquid removed from the in the dewatering device and the supernatant liquid from the thickener are mixed with makeup water to form a recycle liquor. This recycle liquor is pumped to the reaction tank and mixed with additional sulfur oxide absorbent to form additional reactant mixture and is recycled to the scrubbing system.

A major problem associated with recycling the liquid removed from the scrubber sludge is that water soluble impurities present therein are also recycled. These impurities may enter the scrubber cycle either through their presence in the fuel from which the flue gas was generated or from their presence in the makeup water being continuously added to the slurry to replace water lost in the scrubber or in the sludge dewatering cycle. By recycling the impurities the concentration of these impurities in the reactant mixture tends to build up.

An impurity which can cause serious problems is chlorine. In the low pH environment in the scrubber, the presence of chloride ions in the reactant mixture can contribute to corrosion of the structure of the scrubber module, the piping, various tanks associated with the scrubber and other contacted surfaces. As chloride is normally present in the makeup water added to the reactant mixture and often in the fuel, particularly coal, from which the flue gas is generated, the rapid buildup of chloride ions can be a major problem.

One obvious solution to this problem is simply to discard rather than recycle the liquid removed from scrubber sludge. However, because of the presence of chlorine and other undissolved impurities, the liquid cannot be merely discharged to the environment without creating a potential risk of a serious water pollution problem. Although techniques such as reverse osmosis and vapor compression evaporation have been proposed to remove water-soluble impurities from this liquid, such techniques are expensive and exhibit questionable reliability.

SUMMARY OF THE INVENTION

Therefore, it is an object of the present invention to provide a process of limiting the buildup of chloride concentration in an aqueous reactant mixture.

It is a further object of the present invention to provide such a process wherein the buildup of chloride concentration is controlled by removing a portion of the chloride salt present in the reactant mixture as a dry solid.

According to the process of the present invention, a portion of the chloride containing liquor being recycled to the scrubber module of a wet-type scrubber from a spent reactant dewatering cycle is purge from the recycle stream and passed in contact with a drying medium, such as the hot flue gas or heated air, at a location upstream of a dry particulate collector. The chloride salts present in the purge stream crystalize to form solid particles as the moisture in the purge stream of recycle liquor is evaporated by the heat content of the hot flue gas. The solid particles of chloride salt are then collected in the dry particulate collector and disposed of as a solid waste product.

In one embodiment of the process of the present invention the purge liquor is simply sprayed into the flue gas generated in the furnace to the dry particulate collector at a location sufficiently upstream of the dry collector to permit the moisture in the purge liquor to evaporate before the flue gas enters the dry collector.

In an alternate embodiment, the purge liquor is passed to an evaporator along with the drying medium which comprises either a portion of the hot flue gas generated in a furnace or heated air. The purge liquor is then sprayed into the hot flue gas or heated air as it enters the evaporator. Complete evaporation of the moisture contained in the purge liquor occurs in the evaporator and a substantial portion of the crystalized chloride salts are collected in the hopper of th evaporator. The solids laden flue gas or air leaving the evaporator is then returned to the main flue gas stream at a location upstream of the dry particulate collector.

DESCRIPTION OF THE PREFERRED EMBODIMENT

Figure 1:
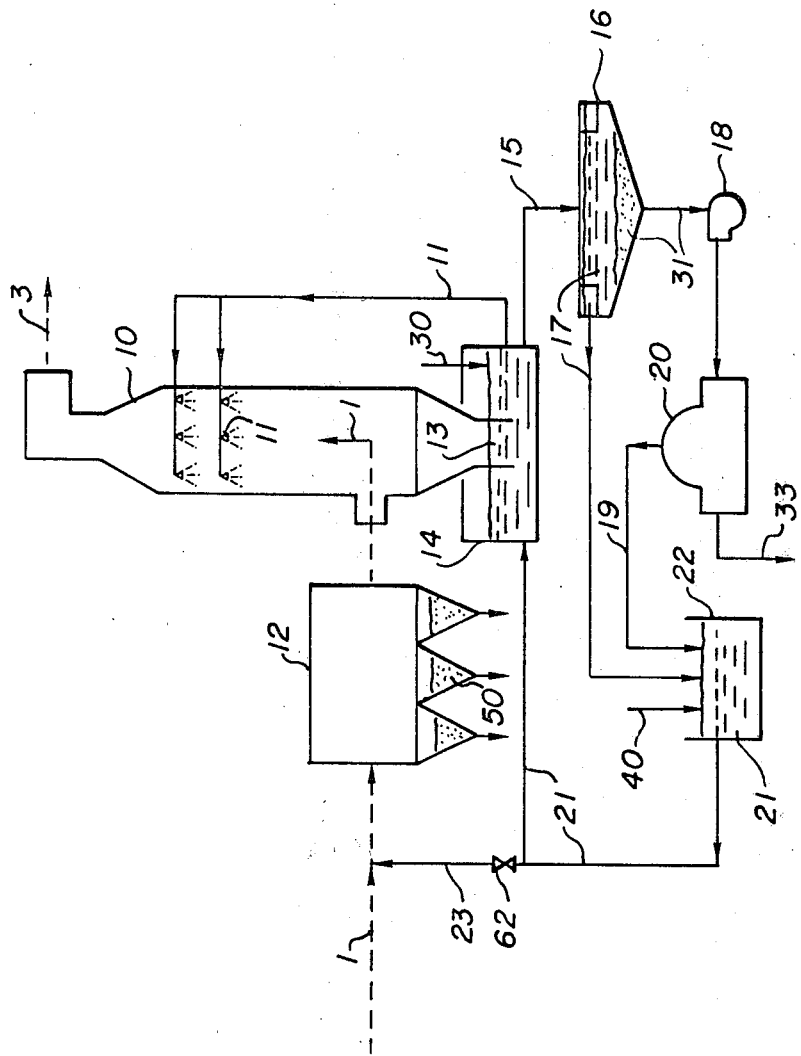
FIG. 1 is a schematic flow diagram showing one embodiment of the process of the present invention.
Figure 2:
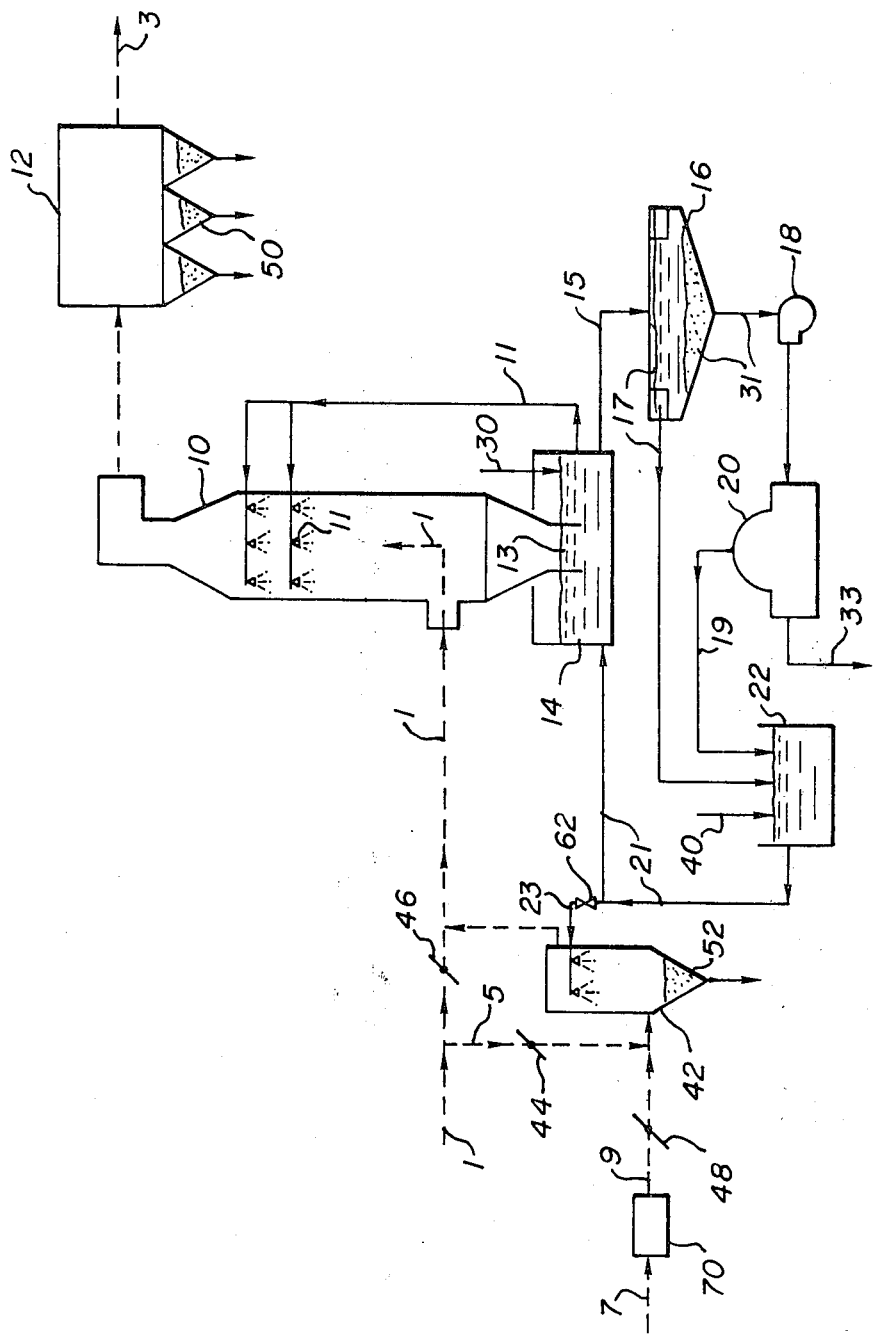
FIG. 2 is a schematic flow diagram illustrating another embodiment of the process of the present invention.

Referring now to the drawing, there is depicted therein in schematic form a sulfur oxide scrubber system utilizing the process of the present invention. As shown therein, sulfur oxide and particulate matter laden flue gas 1 generated by the combustion of fossil fuel is passed to a wet-type sulfur oxide scrubber 10 wherein a substantial portion of the sulfur oxides present in the flue gas are absorbed and removed. Additionally, the flue gas traverses a dry particulate collector 12 wherein particulate matter entrained in the flue gas is removed therefrom. The dry particulate collector 12 may be disposed either upstream or downstream of the scrubber 10. The relatively clean, i.e., low particulate and low sulfur oxide content, flue gas 3 is vented to the atmosphere.

As the flue gas passes through the scrubber module 10 it is contacted with an aqueous sulfur oxide absorbent reactant mixture 11. The sulfur oxides contained within the flue gas 1 react with the sulfur oxide absorbent in the aqueous reactant mixture 11 to form the bisulfite, sulfite and sulfate salt of the sulfur oxide absorbent compound which is most typically an alkali metal such as calcium, magnesium or sodium. The spent reactant mixture 13, rich in sulfur containing salts drains from the scrubber module 10 and collects in reaction tank 14 disposed beneath the scrubber module 10.

Within the reaction tank 14, the relatively water-insoluble sulfite and sulfate salts of the alkali absorbent crystalize forming a concentration of solids in the mixture. To control the solids concentration, a portion 15 of the spent mixture is passed from the reaction tank 14 through a dewatering cycle. In the typical dewatering cycle, the spent mixture 15 is passed to a thickener 16 wherein the sulfite and sulfate solids are allowed to settle out thereby forming in the thickener 16 a sludge 31 of sulfite and sulfate salts covered by a relaively solids-free supernatant liquid 17.

The sludge 31 is conveyed by pumping means 18 to a dewatering device 20, typically a vacuum filter or a filter press. In the dewatering device 20, much of the remaining liquid is removed from the sludge 31 to yield a relatively low moisture sludge 33 suitable for disposal. The additional liquid 19 removed from the sludge 31 in the dewatering device 20 and the supernatant liquid 17 from the thickener 16 are passed to a holding tank 22 wherein they are mixed with makeup water 40 to form a recycle liquor 21. The recycle liquor 21 is recycled back to the reaction tank 14 where it is mixed with additional sulfur oxide absorbent compound 30 to form additional sulfur oxide absorbent reactant mixture 11 which is passed to the scrubber module 10 for cleaning of the flue gas 1.

As mentioned previously, a major problem associated with recycling the liquid removed from the scrubber sludge is that water soluble impurities present therein are also recycled to the scrubber. In particular, the accumulation of soluble chlorides in the aqueous reactant mixture has a generally adverse effect on the design and operation of flue gas scrubbers. Design accommodations made to account for the presence of high chloride levels are costly in both terms of initial capital investment and operating expense.

Chlorides enter the scrubber system from two major sources: the flue gas 1 to be cleaned and the makeup water 40. Organic and inorganic chloride compounds in the fuel from which the flue gas is generated form hydrogen chloride gas during the combustion process. The hydrogen chloride gas is readily absorbed by the alkali absorbent compounds making up the aqueous reactant mixture. Upon absorption into the aqueous reactant, the hydrogen chloride dissociates do form hydrogen and chloride ions. Additionally, the makeup water 40 which is added to the recycle stream 21 to replace the water lost to evaporation in the scrubber or the water lost in the sludge disposal stream 33 invariably contains chloride ions. Over a period of time, the recycling of the chloride ions in the recycle stream results in a gradual but continuous buildup of chloride concentration within the reactant mixture. The buildup of the chloride concentration within the reactant mixture is aggravated by the use of lower grade coal as fuel, the use of lower quality water for makeup, and the more complete dewatering of the slurry sludge in order to alleviate potential water pollution problems.

In accordance with the present invention, a portion 23 of the chloride-containing recycle liquor 21 is diverted from returning to the scrubbing process and is thence passed as a purge stream in contact with a drying medium comprising either hot flue gas or heated air so as to evaporate the water in the purge steam 23 and crystalize the chloride impurities contained therein. The crystalized solid particles of chloride salt are then removed from the flue gas or heated air as a dry solid.

In one embodiment of the process of the present invention, as shown in FIG. 1, the purge stream 23 of the recycle liquor 21 is sprayed directly into the flue gas 1 at a location upstream of the gas scrubber 10. Additionally, a dry particulate collector 12 is disposed between the gas scrubber 10 and the upstream point of injection of the purge stream 23 into the flue gas 1. As the purge stream 23 is injected into the flue gas 1, the water in the purge stream 23 evaporates by absorbing heat from the hot flue gas. The point of injection of the purge stream 23 into the flue gas 1 is sufficiently upstream of the particulate collector 12 to insure that complete evaporation of the water contained in the purge stream 23 has occurred and the chloride impurities within the purge liquor 23 crystalize as dry solid chloride salts prior to the flue gas entering the dry particulate collector 12. Preferably, the purge stream is injected into the flue gas passing through the furnace heat transfer sections or the flue gas leaving the air heater of the furnace. The dry chloride salts, along with any other particulate matter such as flyash in the flue gas 1, are removed from the flue gas in the dry particulate collector 12 as a dry solid 50. A dry solid 50 collects in the hopper of the dry particulate collector 12 and may be periodically removed therefrom through standard particulate handling techniques and disposed of.

In an alternate embodiment of the process of the present invention, the purge stream 23 of recycle liquor 21 is passed to an evaporator 42 wherein it is contacted with a drying gas comprised of either a portion 5 of the flue gas 1 or heated air 9. As the purge stream 23 passes into the evaporator 42, it is contacted with the drying gas. The water in the purge stream 23 evaporates by absorbing heat from the drying gas flowing through the evaporator. As the water evaporates, the chloride impurities within the purge stream 23 crystalize as dry solid salts. The drying gas laden with solid chloride salts is thence passed through a dry particulate collector wherein the dry solids, including the chloride salts, are removed from the drying gas.

When the hot flue gas serves as the drying gas, the fraction 5 of the flue gas passed to the evaporator 42 is controlled by dampers 44 and 46 so as to pass only that amount of flue gas necessary to cause complete evaporation within the evaporator 42 of the water contained in the purge stream 23 of recycled liquor 21. After leaving the evaporator 42, the flue gas 5 is reunited with the flue gas 1 at a location upstream of the gas scrubber 10. The chloride impurities contained with the purge stream 23 crystalize to form dry solid particles 52. A portion of the solids collect in the hopper of the evaporator while the remainder are removed in the particulate collector disposed at a location downstream of the evaporator 42.

If air is to be used as the drying gas, atmospheric air 7 is heated to a desired temperature in air heater 70 to provide a supply of heated air 9 to the evaporator 42. A shut-off damper 48 is provided to close off the air supply when flue gas is used as the drying gas. Upon leaving the evaporator 42, the air is passed through a dry particulate collector to remove the crystalized solids before the air is vented to the atmosphere.

In either embodiment of the process of the present invention, it is preferable to regulate the amount of recycle liquor in the purge stream as a means of controlling the chloride concentration within a preselected range or below a preselected level of permissible chloride concentration. To do so, the chloride concentration in the reactant slurry 11 is monitored either by continuous or periodic measurement. In response to the measured chloride concentration of the reactant mixture, a flow valve 62 in the purge stream 23 is opened or closed to regulate the amount of recycle liquor 21 in the purge stream 23 so as to maintain the chloride concentration of the reactant mixture below the preselected level.

The process of the present invention permits the buildup of chloride concentration within the reactant mixture of the gas scrubber to be limited and in an inexpensive, efficient and ecological way. The chloride salts are collected as a dry solid and removed from the scrubbing system. They may be either disposed of or even utilized in other chemical processes. The present invention avoids the environmental problems associated with simply discharging the chloride-laden recycle liquor to a settling pond along with the scrubber sludge. The process of the present invention is efficient in that the heat used to evaporate the water and crystalize the dissolved chloride is provided by the flue gas. This heat would normally simply be lost to the atmosphere as the flue gas is passed up the stack. Further, existing flyash collection and ash handling equipment can be used to collect and dispose of the dry chloride salts.

Additionally, the purge stream required to maintain an acceptable chloride concentration within the recycle mixture is surprisingly small. For example, on a typical 750 megawatt coal fired boiler, a purge flow of only 50 gallons per minute would be required to control the chloride level in the reactant mixture of the flue gas desulfurization system at a level below 25 thousand parts per million by weight. The moisture content of such a small quantity of recycle liquor can be readily evaporated by the flue gas upstream of the gas scrubber with a resultant drop in flue gas temperature on the order of about 10° F.

While the present invention has been described and shown in connection with a flue gas desulfurization system, it will be appreciated that the present process is applicable to wet scrubbers for removing a number of gaseous pollutants from flue gas and not limited to merely removing sulfur oxides from the flue gas. It will also be appreciated that modifications of the present process, some of which have been alluded to hereinabove, may readily be made thereto by those skilled in the art. Therefore, we intend by the appended claims to cover the embodiments alluded to herein as well as all modifications thereto which fall within the true spirit and scope of our invention.

We claim:

1. A process for wet scrubbing a flue gas to remove sulfur oxides therefrom of the type including the steps of contacting the sulfur oxide laden flue gas with an aqueous reactant mixture comprised of water, unreacted sulfur oxide absorbent and small amounts of water soluble chloride impurities whereby the sulfur oxide absorbent compound reacts with and absorbs the sulfur oxides contained in the flue gas, collecting and dewatering the spent reactant mixture to yield a relatively dry sludge of sulfur-containing solids and a relatively solids-free chloride containing liquor, discharging the relatively dry sludge to disposal, recycling the relatively solids-free chloride containing liquor removed from the spent reactant mixture for mixing with unreacted sulfur oxide absorbent to form additional reactant mixture for contacting with the sulfur oxide laden flue gas, characterized in that the concentration of chloride in the reactant mixture is controlled by the steps of:
   a. prior to mixing the relatively solids-free chloride containing recycle liquor from the dewatering step with unreacted sulfur oxide absorbent, passing a purge stream of the relatively solids-free chloride containing recycle liquor from the dewatering step in contact with a hot drying gas so as to evaporate the water in the purge stream and crystalize the chloride impurities contained in the purge stream; and
   b. separating the crystalized solid particles of chloride salt from the drying gas.

2. A process as recited in claim 1 wherein the sulfur oxide absorbent is an alkali from the group consisting of slaked limed, limestone, dolomite, magnesium hydroxide, sodium carbonate, and sodium hydroxide.

3. A process as recited in claim 1 or 2 wherein the drying gas is hot flue gas.

4. A process as recited in claim 1 or 2 wherein the drying gas is heated air.

* * * * *